(12) United States Patent
Fantappie

(10) Patent No.: US 10,150,089 B2
(45) Date of Patent: Dec. 11, 2018

(54) APPARATUSES, SYSTEMS AND METHODS FOR EFFICIENT SOLUBILIZATION OF CARBON DIOXIDE IN WATER USING HIGH ENERGY IMPACT

(71) Applicant: Apiqe Holdings, LLC, Torrance, CA (US)

(72) Inventor: Giancarlo Fantappie, Rancho Palos Verdes, CA (US)

(73) Assignee: Apiqe Holdings, LLC, Torrance, CA (US)

( * ) Notice: Subject to any disclaimer, the term of this patent is extended or adjusted under 35 U.S.C. 154(b) by 127 days.

(21) Appl. No.: 15/144,443

(22) Filed: May 2, 2016

(65) Prior Publication Data

US 2016/0296895 A1    Oct. 13, 2016

Related U.S. Application Data

(60) Continuation of application No. 14/162,343, filed on Jan. 23, 2014, now abandoned, which is a
(Continued)

(51) Int. Cl.
  *B01F 3/04*   (2006.01)
  *A23L 2/54*   (2006.01)
  (Continued)

(52) U.S. Cl.
  CPC ............ *B01F 3/04808* (2013.01); *A23L 2/54* (2013.01); *A47J 31/00* (2013.01); *B01F 3/04503* (2013.01);
  (Continued)

(58) Field of Classification Search
  CPC ... A23L 2/54; A23V 2002/00; A23V 2250/11; A47J 31/00; B01F 3/04503;
  (Continued)

(56) References Cited

U.S. PATENT DOCUMENTS

| 1,029,236 A | 6/1912 | Shattuck et al. |
| 2,162,842 A | 6/1939 | Dolison |

(Continued)

FOREIGN PATENT DOCUMENTS

| CN | 1277594 A | 12/2000 |
| CN | 1914123 A | 2/2007 |

(Continued)

OTHER PUBLICATIONS

Chinese Office Action in CN Appl. Ser. No. 201180033123.X dated Mar. 6, 2015.
(Continued)

*Primary Examiner* — Charles S Bushey
(74) *Attorney, Agent, or Firm* — Foley & Lardner LLP; James De Vellis

(57) ABSTRACT

A method for the efficient solubilization of carbon dioxide in water through the use of high energy impacts is disclosed. The method can optionally includes mixing the carbon dioxide and water to form an annular dispersed flow, accelerating the carbon dioxide and water prior to the collision; providing a retention network to collect the carbonated water flow. Also disclosed are systems and apparatuses for practicing the disclosed methods.

22 Claims, 6 Drawing Sheets

Related U.S. Application Data continuation of application No. 13/780,977, filed on Feb. 28, 2013, now Pat. No. 8,636,268, which is a division of application No. 12/772,641, filed on May 3, 2010, now Pat. No. 8,567,767.

(51) Int. Cl.

| | | |
|---|---|---|
| *B01F 5/06* | (2006.01) | |
| *B01F 11/02* | (2006.01) | |
| *A47J 31/00* | (2006.01) | |
| *B01F 5/04* | (2006.01) | |

(52) U.S. Cl.
CPC ...... *B01F 3/04787* (2013.01); *B01F 3/04985* (2013.01); *B01F 5/04* (2013.01); *B01F 5/061* (2013.01); *B01F 5/0615* (2013.01); *B01F 5/0641* (2013.01); *B01F 5/0688* (2013.01); *B01F 11/0208* (2013.01); *A23V 2002/00* (2013.01); *B01F 2215/0022* (2013.01); *B01F 2215/045* (2013.01); *B01F 2215/0468* (2013.01)

(58) Field of Classification Search
CPC .............. B01F 3/04787; B01F 3/04808; B01F 3/04985; B01F 5/04; B01F 5/061; B01F 5/0615; B01F 5/0641; B01F 5/0688; B01F 11/0208; B01F 2215/0022; B01F 2215/045; B01F 2215/0468
USPC ........... 261/79.2, 115, 116, DIG. 7; 366/337, 366/340, 341; 426/477
See application file for complete search history.

(56) References Cited

U.S. PATENT DOCUMENTS

| | | |
|---|---|---|
| 2,173,979 A | 9/1939 | Picut |
| 2,271,982 A | 2/1942 | Van Kreveld et al. |
| 2,899,170 A | 8/1959 | Cornelius |
| 2,924,238 A | 8/1960 | Corenlius |
| 3,502,111 A | 3/1970 | Hansen |
| 3,526,391 A | 9/1970 | Church, Jr. |
| 3,648,984 A | 3/1972 | Mimura et al. |
| 3,744,762 A | 7/1973 | Schlicht |
| 3,761,066 A | 9/1973 | Wheeler |
| 4,068,830 A | 1/1978 | Gray |
| 4,078,578 A | 3/1978 | Buchholz |
| 4,081,863 A | 3/1978 | Rees |
| 4,087,862 A | 5/1978 | Tsien |
| 4,124,309 A | 11/1978 | Yao |
| 4,271,992 A | 6/1981 | Becker |
| 4,695,378 A | 9/1987 | Ackman et al. |
| 4,753,535 A | 6/1988 | King |
| 4,783,319 A | 11/1988 | Habrich et al. |
| 4,940,164 A | 7/1990 | Hancock et al. |
| 4,948,505 A | 8/1990 | Petrucci et al. |
| 5,033,651 A | 7/1991 | Whigham et al. |
| 5,050,806 A | 9/1991 | Anderson et al. |
| 5,064,097 A | 11/1991 | Brog et al. |
| 5,192,513 A | 3/1993 | Stumphauzer et al. |
| 5,473,909 A | 12/1995 | Kateman et al. |
| 5,510,060 A | 4/1996 | Knoll |
| 5,538,028 A | 7/1996 | Lombardo |
| 5,842,600 A | 12/1998 | Singleterry et al. |
| 5,934,328 A | 8/1999 | Conrad et al. |
| 6,041,970 A | 3/2000 | Vogel |
| 6,060,092 A | 5/2000 | Oesterwind et al. |
| 6,120,685 A | 9/2000 | Carlson et al. |
| 6,253,963 B1 | 7/2001 | Tachibana |
| 6,669,238 B1 | 12/2003 | Santy, Jr. |
| 7,048,148 B2 | 5/2006 | Roekens et al. |
| 7,059,591 B2 | 6/2006 | Bortkevitch et al. |
| 7,338,551 B2 | 3/2008 | Kozyuk |
| 7,445,133 B2 | 11/2008 | Ludovissie et al. |
| 7,513,398 B2 | 4/2009 | Miller |
| 7,600,911 B2 | 10/2009 | Bechtold |
| 7,815,078 B2 | 10/2010 | Robinson |
| 7,878,705 B2 | 2/2011 | Schauerte |
| 7,913,984 B2 | 3/2011 | Noguchi et al. |
| 8,091,737 B2 | 1/2012 | Smeller et al. |
| 8,109,413 B2 | 2/2012 | Schroeder et al. |
| 8,177,197 B1 | 5/2012 | Ergican |
| 8,191,867 B2 | 6/2012 | Spiegel |
| 8,499,978 B2 | 8/2013 | Dalchau et al. |
| 8,567,767 B2 | 10/2013 | Fantappie |
| 8,631,974 B2 | 1/2014 | Piatnik et al. |
| 8,636,268 B2 | 1/2014 | Fantappie |
| 8,960,500 B2 * | 2/2015 | Van Opstal et al. |
| 9,309,103 B2 * | 4/2016 | Ergican ................ B67D 1/0058 |
| 9,610,551 B2 * | 4/2017 | Erigican ................ B01F 3/0451 |
| 2001/0027809 A1 | 10/2001 | Guillaume et al. |
| 2003/0080037 A1 | 5/2003 | Mazzei |
| 2003/0080443 A1 | 5/2003 | Bosko |
| 2004/0011710 A1 | 1/2004 | Kato et al. |
| 2004/0144710 A1 | 7/2004 | Bassett et al. |
| 2004/0251566 A1 | 12/2004 | Kozyuk |
| 2005/0161394 A1 | 7/2005 | Fritze et al. |
| 2006/0051448 A1 | 3/2006 | Schryver et al. |
| 2006/0056271 A1 | 3/2006 | Kapila et al. |
| 2006/0086136 A1 | 4/2006 | Maritan et al. |
| 2006/0138170 A1 | 6/2006 | Brim et al. |
| 2006/0280027 A1 | 12/2006 | Fulton |
| 2006/0288874 A1 | 12/2006 | Ziesel |
| 2007/0070807 A1 | 3/2007 | Bracht et al. |
| 2007/0257378 A1 | 11/2007 | Spiegel |
| 2009/0026637 A1 | 1/2009 | Goltenboth et al. |
| 2009/0236277 A1 | 9/2009 | Kurth et al. |
| 2010/0024890 A1 | 2/2010 | Romanyszyn et al. |
| 2010/0107887 A1 | 5/2010 | Bentley et al. |
| 2010/0133708 A1 | 6/2010 | Fischer |
| 2011/0316175 A1 | 12/2011 | Kumar et al. |
| 2017/0197815 A1 * | 7/2017 | Erigican ................ B01D 29/15 |

FOREIGN PATENT DOCUMENTS

| | | |
|---|---|---|
| DE | 19742301 | 11/1998 |
| DE | 10 2006 048 456 | 4/2008 |
| EP | 1 090 677 A1 | 4/2001 |
| EP | 1 716 918 | 11/2006 |
| EP | 2 070 586 | 6/2009 |
| EP | 2 070 587 A1 | 6/2009 |
| JP | 2001-187326 | 7/2001 |
| JP | 2001-335520 | 12/2001 |
| JP | 2005-288052 | 10/2005 |
| JP | 2007-089710 | 4/2007 |
| JP | 2008-289990 | 12/2008 |
| KR | 10-2005-0095340 | 9/2005 |
| KR | 10-2006-0003947 | 1/2006 |
| KR | 10-2006-0102726 | 9/2006 |
| KR | 10-0634782 | 10/2006 |
| KR | 10-2008-0101047 | 11/2008 |
| KR | 10-0900275 | 5/2009 |
| TW | 200827291 | 7/2008 |
| WO | WO-99/21798 | 5/1999 |
| WO | WO-00/07707 | 2/2000 |
| WO | WO-00/25904 A1 | 5/2000 |
| WO | WO-2005/075365 | 8/2005 |
| WO | WO-2006/044346 | 4/2006 |
| WO | WO-2007/028390 | 3/2007 |
| WO | WO-2008/120076 | 10/2008 |

OTHER PUBLICATIONS

Chinese Office Action in CN Appl. Ser. No. 201180033123.X dated Nov. 30, 2014.

Chinese Office Action in CN Appl. Ser. No. 201180033123.X dated Oct. 29, 2015.

European Search Report in Application No. 12802533.5, dated Jul. 21, 2015.

European Search Report on EP Appl. Ser. No. 12802311.6 dated Nov. 13, 2014.

(56) References Cited

OTHER PUBLICATIONS

European Search Report received in EP Appl. No. 12802311.6 dated Mar. 17, 2016.
IL Office Action in IL Appl. No. 222838, dated Jul. 21, 2015.
International Preliminary Report on Patentability for PCT Appl. Ser. No. PCT/US2011/033709 dated Nov. 6, 2012.
International Preliminary Report on Patentability for PCT Appl. Ser. No. PCT/US2012/043708 dated Dec. 23, 2013.
International Preliminary Report on Patentability for PCT Appl. Ser. No. PCT/US2012/043797 dated Dec. 23, 2013.
International Preliminary Report on Patentability for PCT Appl. Ser. No. PCT/US2012/043873 dated Dec. 23, 2013.
International Preliminary Report on Patentability for PCT Appl. Ser. No. PCT/US2012/044041 dated Dec. 23, 2014.
International Search Report for PCT Appl. Ser. No. PCT/US2011/033709 dated Oct. 21, 2011.
International Search Report for PCT Appl. Ser. No. PCT/US2012/043708 dated Jan. 28, 2013.
International Search Report for PCT Appl. Ser. No. PCT/US2012/043797 dated Nov. 26, 2012.
International Search Report for PCT Appl. Ser. No. PCT/US2012/044041 dated Jan. 25, 2013.
Japanese Office Action in JP Appl. Ser. No. 2013-509106 dated Mar. 16, 2015.
Office Action and Search Report for Taiwan Appl. Ser. No. 100114244 dated Feb. 5, 2016.
Office Action in Mexican Appl. Ser. No. MX/a/2012/012838 dated Dec. 8, 2014.
Office Action in Mexican Patent Appl. Ser. No. MX/a/2012/012838 dated Apr. 22, 2014.
Office Action in U.S. Appl. No. 14/138,831 dated Aug. 27, 2015.
U.S. Notice of Allowance in U.S. Appl. No. 14/138,712, dated Dec. 4, 2015.
U.S. Office Action in U.S. Appl. No. 14/138,811, dated May 27, 2016.
U.S. Office Action in U.S. Appl. No. 14/138,831, dated Jan. 12, 2016.
U.S. Office Action in U.S. Appl. No. 14,138,817, dated Oct. 15, 2015.
U.S. Office Action in U.S. Appl. No. 14/138,712, dated Aug. 13, 2015.
U.S. Office Action in U.S. Appl. No. 14/162,343, dated Oct. 30, 2015.
U.S. Office Action in U.S. Appl. No. 14/138,817 dated Mar. 26, 2015.
U.S. Office Action received in U.S. Appl. No. 14/138,831, dated Jun. 24, 2016.
U.S. Notice of Allowance in U.S. Appl. No. 12/772,641 dated Aug. 16, 2013.
U.S. Notice of Allowance in U.S. Appl. No. 13/780,977 dated Oct. 16, 2013.
U.S. Office Action in U.S. Appl. No. 12/772,641 dated Nov. 29, 2012.
U.S. Office Action in U.S. Appl. No. 12/772,641 dated Jun. 4, 2012.
U.S. Office Action in U.S. Appl. No. 13/780,977 dated Jun. 4, 2013.
AR Office Action received in AR Appl. No. P20110101508, dated Jan. 11, 2018.
AR Office Action received in AR Appl. No. P20110101508, dated May 17, 2017.
CA Office Action in Appl. No. 2,834,977 dated May 5, 2017.
EP Search Report received in EP Appl. No. 12802311.6, dated Oct. 21, 2016.
Extended EP Search Report in EP Appl. No. 11777860.5 dated Jul. 7, 2017.
KR Office Action in KR Appl. No. 10-2012-031660 dated Apr. 13, 2017.
U.S. Office Action on U.S. Appl. No. 14/138,811 dated Nov. 25, 2016.
U.S. Notice of Allowance for U.S. Appl. No. 14/138,831, dated Jan. 5, 2017.
U.S. Notice of Allowance for U.S. Appl. No. 14/138,811, dated Oct. 11, 2017.
U.S. Office Action for U.S. Appl. No. 14/138,831, dated Oct. 20, 2016.
U.S. Office Action in U.S. Appl. No. 14/138,811, dated Mar. 23, 2017.

* cited by examiner

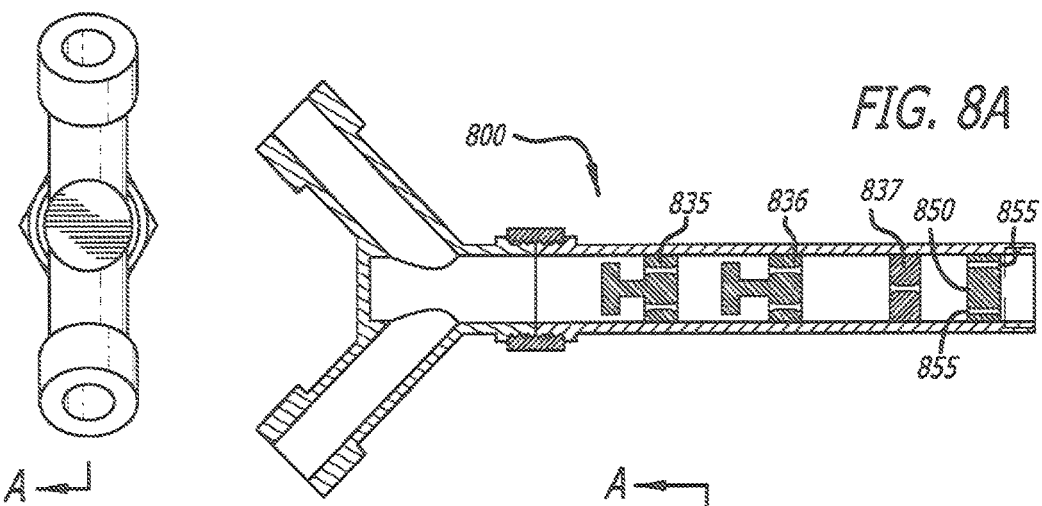
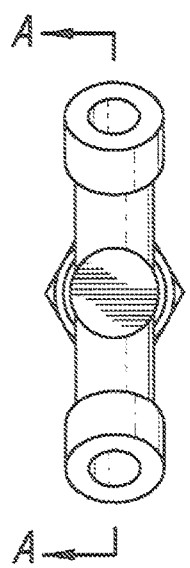
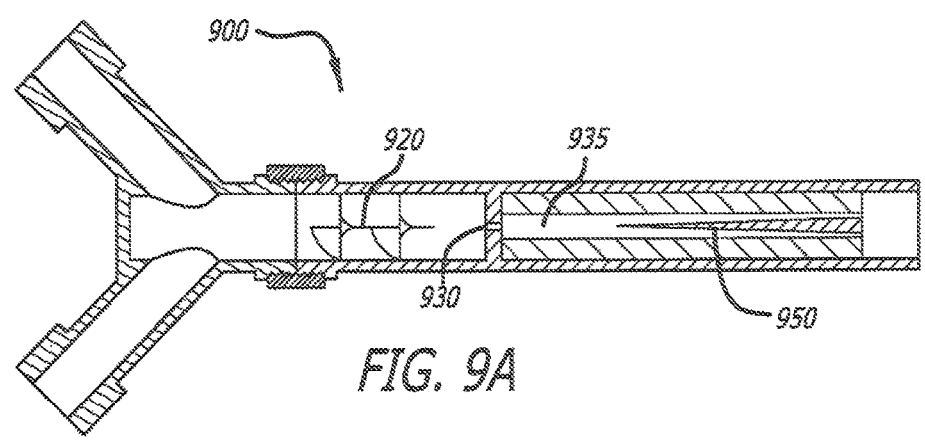

APPARATUSES, SYSTEMS AND METHODS FOR EFFICIENT SOLUBILIZATION OF CARBON DIOXIDE IN WATER USING HIGH ENERGY IMPACT

CROSS REFERENCE TO RELATED APPLICATIONS

The present application claims priority to and is a continuation of U.S. patent application Ser. No. 14/162,343 (now abandoned), which is a continuation of U.S. patent application Ser. No. 13/780,977, filed Feb. 28, 2013 (now U.S. Pat. No. 8,636,268), which claims priority to and is a divisional application of U.S. patent application Ser. No. 12/772,641, filed May 3, 2010 (now U.S. Pat. No. 8,567,767). The entire contents of the foregoing applications are incorporated herein by reference.

FIELD OF THE INVENTION

The present disclosure relates to apparatuses, systems and methods for solubilizing gases into liquids and, in particular, creating carbonated beverages for human consumption.

BACKGROUND OF THE INVENTION

Water and carbon dioxide are generally immiscible under normal environmental conditions, i.e., room temperature and atmospheric pressure. Apparatuses and methods are known for producing carbonated water by creating conditions under which carbon dioxide will become water-soluble. Generally, carbon dioxide becomes more soluble in water as pressures increase and temperatures decrease.

Most commercialized devices for carbonating water use carbon dioxide sprayed into a water container: the result obtained with this process is very poor and the carbonation of water is weak and does not last too long. Devices for producing and dispensing carbonated beverages in water dispensing units, instead, typically employ a carbonating tank, called a saturator, and a high-pressure water pump. Carbonated water is produced by pressurizing the saturator tank with carbon dioxide and filling the tank with chilled water. Due to the high pressures resident in the saturator tank, typically around 70 psi, a relatively expensive high-pressure water pump is required to inject water into the tank. Furthermore, under the conditions in the saturator tank, the carbon dioxide takes time to dissolve into to the water and achieve a palatable level of carbonization. Accordingly, the saturator is typically large enough to hold a ready supply of carbonated water for dispensing and does not create new carbonated water instantaneously on demand. To maintain this supply, two or more sensors—and associated electronic controls—are used to start the high pressure pump and inject water into saturator when the level of carbonated water in the saturator falls below a set threshold and then stop the water injection when the tank fills to an appropriate level.

These typical carbonization devices take up a relatively large amount of space and require expensive and complicated electronic and hydraulic control systems. Due to this complex structure, these devices are noisy, use significant amounts of energy, and require frequent maintenance.

SUMMARY OF THE INVENTION

The embodiments of the disclosed inventions teach efficient and inexpensive methods, apparatuses and systems for the solubilization of carbon dioxide in water.

In accordance with one exemplary embodiment of the present disclosure a method for solubilizing carbon dioxide in water is taught. The method begins with the injection of water and carbon dioxide into a chamber. There the carbon dioxide and water are mixed to create an annular-dispersed flow in the chamber. This flow is then accelerated and directed to collide with a rigid surface, thereby creating a pressure sufficient to solubilize the carbon dioxide into the water. The carbonated water is then collected for dispensing.

In accordance with another exemplary embodiment of present disclosure an apparatus is disclosed that can be placed in a water line path to create carbonated water for dispensing. Advantageously, the apparatus accepts carbon dioxide and water through an inlet path. From there the flow of carbon dioxide and water are passed through one or more dispersion elements arranged within the conduit to create a dispersed flow. The dispersed flow then passes through a passive accelerator within the conduit, thereby greatly increasing the kinetic energy of the system. The accelerated flow is directed to collide with a rigid impact surface immediately downstream of the passive accelerator. This collision creates sufficient pressure to solubilize the carbon dioxide into the water. A retention network is provided at the output of the apparatus to collect and regulate the flow of carbonated water.

Further embodiments including advantageous aspects of the disclosed methods, apparatuses and systems are described in the detailed disclosure. All the disclosures herein are merely exemplary and can be readily adapted by persons of skill in the art without diverting from spirit and scope of the disclosed and claimed inventions.

BRIEF DESCRIPTION OF THE FIGURES

The accompanying drawings illustrate various non-limiting, representative, inventive aspects in accordance with the present disclosure:

FIG. 6 is an embodiment of an apparatus for use with the disclosed systems and methods.

FIGS. 8 and 8A show views of an embodiment of an apparatus for use with the disclosed systems and methods.

FIGS. 9 and 9A show views of an embodiment of an apparatus for use with the disclosed systems and methods.

DETAILED DESCRIPTION OF THE INVENTION

Apparatuses, systems and methods are disclosed herein for the quick and efficient solubilization of carbon dioxide in water. In particular, carbonated water is created through the instantaneous transformation of kinetic energy into a localized pressure wave to create a region with an energy density sufficient to solubilize carbon dioxide into water. This can be achieved through the use of an apparatus that sits in-line with the water supply to create a continuous flow of carbonated water.

Figure 1A:
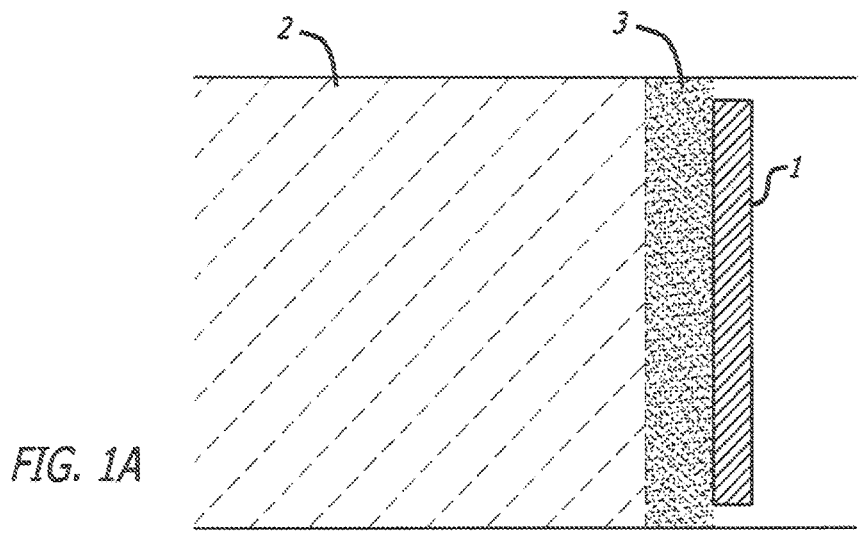
FIG. 1A illustrates a conceptual diagram of one aspect of the disclosed methods, systems and apparatuses.

One particularly advantageous aspect of the disclosed method is the solubilization of carbon dioxide in water through the collision of a carbon dioxide/water stream with a rigid surface. FIG. 1A shows conceptual diagram of the interactions occurring in an exemplary collision in accordance with the present invention.

As shown in FIG. 1A, a carbon dioxide/water stream 2 is directed at a rigid surface, such as wall 1. Upon collision with the wall the momentum of the stream 2 is suddenly brought to zero creating a zone of high energy density and very large local pressure 3. The large pressure created by the collision results in the solubilization of the carbon dioxide into the water.

In pressure zone 3, huge numbers of instantaneous collisions creating solubilization occur between: the carbon dioxide/water mixture and the rigid surface; the incoming stream and the carbon dioxide and water droplets that have bounced off the rigid surface (i.e., the scattered mixture); and, the scattered mixture and side walls of the conduit carrying the stream.

The change in momentum that occurs when the carbon dioxide/water stream collides with the rigid surface results in a force exerted on the stream. Like all momentum changes, the force applied to create the change is a function of the period of time over which it occurs. Because the momentum changes nearly instantly when the carbon dioxide/water stream collides with the rigid wall, the force is exercised in a very short period of time and is, as a result, extremely large.

Figure 1B:
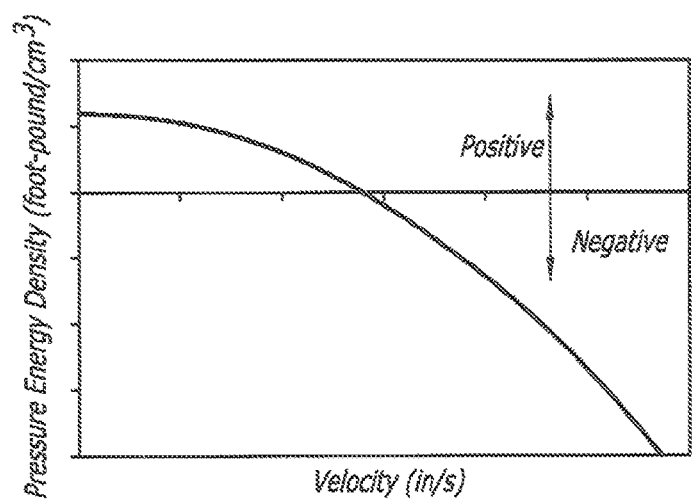
FIG. 1B illustrates aspects of the disclosed methods, systems and apparatuses.

The optimal forces generated in the pressure zone, or the pressure energy densities, that must be obtained in that region for an efficient solubilization are in the range of between −40 to 5 foot-pound/cm$^3$. FIG. 1B is a graph that shows the change in the pressure energy density with respect to the velocity of the carbon dioxide/water stream. As the velocity of the carbon dioxide/water stream increases, the pressure energy density decreases to compensate for the increase in the kinetic energy density. This decrease in pressure energy density is then converted to increase the collision forces at the gas/liquid interface at the rigid wall 1 and the pressure zone 3.

As the mixed carbon dioxide/water stream collides with the rigid wall, the collision forces generated are instantaneous (at time=0). As time continuously advances (time=$t_1$ . . . $t_n$), further collision forces are generated between the incoming carbon dioxide and water molecules and the already solubilized carbon dioxide and water molecules having different directional velocities. The cumulative chain effect is such that the forces act upon each segment of the stream for a given amount of time to further merge the two phases into each other as a result of continuous and instantaneous momentum transfer; thus, producing carbonated water in which carbon dioxide has been thoroughly and completely solubilized.

Figure 2A:
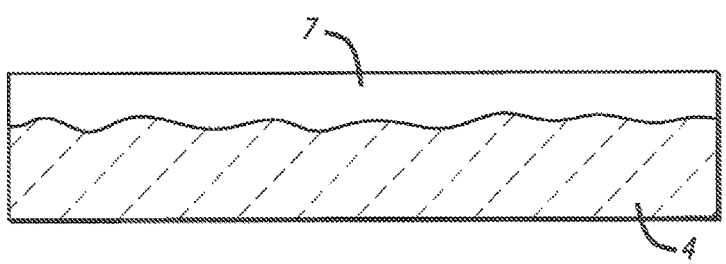
FIGS. 2A and 2B are conceptual diagrams illustrating one aspect of the disclosed methods, systems and apparatuses.

Structuring the water/carbon dioxide stream can further enhance the solubilization of carbon dioxide at the collision site. Without structuring the water/carbon dioxide stream will tend to take on a stratified arrangement with the carbon dioxide and water flowing in substantially discrete layers of water 4 and carbon dioxide 7, as shown in FIG. 2A. These layers inhibit optimal solubilization because they provide a limited amount of surface area contact between the carbon dioxide and the water. This limited surface area of contact reduces the opportunities for the carbon dioxide to solubilize in the water. Structuring the water/carbon dioxide stream to prevent a substantially laminar flow corrects this problem.

Figure 2B:
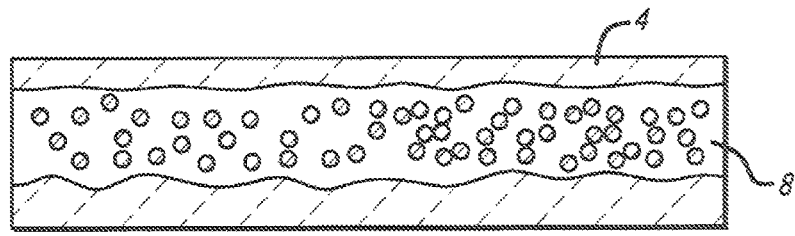

The general goal of the structuring is to create a dispersed flow of water droplets homogenously mixed with the carbon dioxide stream in order to increase the total surface area of contact between the two substances. In practice, the flow pattern never becomes fully dispersed and an annular-dispersed pattern of water 4 and dispersed water and carbon dioxide 8, as shown conceptually in FIG. 2B, is created. As shown, the resulting flow will typically have a carbon dioxide core containing dispersed water droplets that is surrounded by a relatively thin layer of water along the wall of the channel Any known mechanism in the art for creating annular dispersed flows could be adapted to the disclosed methods. For example, this type of flow can be created through stationary mixing elements in the flow path, such as fins protruding from the conduit wall or helical structures axially aligned in the flow path.

The solubilization of carbon dioxide into water can be further enhanced by accelerating the carbon dioxide/water stream prior to its collision with the rigid wall. Preferably, the acceleration is achieved by forcing the stream through an accelerator. As is well known in the art, passing a fluid flow through a restriction will result in an accelerated flow arising due to the principle of mass conservation. This can be accomplished structurally via a simple orifice or more complex engineered structures, such as a Venturi tube.

The accelerator is used to easily increase the kinetic energy of the carbon dioxide/water stream prior to the collision. Thus, for a given inlet speed and pressure, the energy of the carbon dioxide/water flow will be increased without requiring an expensive pumping apparatus. This increased kinetic energy increases the pressure achieved in the pressure zone, which results in improved solubilization at the collision site because more kinetic energy is dissipated.

Acceleration with a restrictor is particularly advantageous when a dispersed flow is accelerated. Passing a dispersed flow through a restriction helps ensure that the carbon dioxide and the water are uniformly accelerated, thereby enhancing solubilization upon collision with the rigid surface.

After collision with the rigid surface the level of carbon dioxide solubilization can be further increased by employing a retention network between the rigid wall and the dispenser outlet to regulate the flow prior to dispensing. The retention network allows the carbonated water to settle to an acceptable pressure for dispensing, for example 10 psi to 40 psi. The retention network allows the high-pressure chaotic flow passing the rigid surface to collect into a regular continuous flow for dispensing.

In addition to creating a suitable flow for dispensing, the retention network also improves the carbonization process. Filling the retention network with fluid assists in maintaining pressure at the outlet of the collision area. This in turn results in a higher pressure inside the pressures zone. In contrast, a relatively low pressure at the outlet of the collision area, such as atmospheric pressure, would allow a ready release of the pressure built in the pressure zone through the outlet of the collision area.

The retention network allows for a relatively high pressure to be maintained at the collision area outlet, which can be gradually reduced to a proper pressure for dispensing the beverage, for example, 10 psi.

The pressure drop through the retention network depends upon length, width and structure of the network. For example, assuming a constant diameter, increasing the length of the retention network will increases the pressure drop through the retention network. Keeping the diameter of the retention network constant at 3/16 inch (0.1875 inch) a retention network about 10 inches long will create a pressure drop of around 120 psi, assuming a starting pressure of about 160 psi.

While the described method of high-energy wall impact described above is alone sufficient to produce carbonated beverages, the combined use of (i) flow structuring dispersion, (ii) accelerators, and, (iii) a retention network after the collisions each operate to a synergistic effect when installed together in series. In other words, adding each step further improves performance of the method and the output product. Using a combination of one or more of these additional steps, preferably all of them, produced a well solubilized carbon dioxide in water mixture.

The disclosed method for producing carbonated water can further be enhanced through the introduction of a chiller, e.g., a refrigerator or the like, to reduce the temperature of the water. The chiller would preferably work to cool the water before it enters the system of flow developers, collision walls, and the retention network, but it could operate such that chilling occurs in any and all of those locations.

The disclosed method could also be further enhanced by increasing the flow pressure of the water in the system, for example by employing a pump in the flow path or a gravity feed from an elevated water supply. A pump or other pressure enhancer, would preferably be positioned prior to the water being mixed with the carbon dioxide by the flow developers. A pump is particularly useful in commercial embodiments intended to be installed in any location because water pressure, especially from municipal water lines, can vary from one location to another. To correct this, a pump can supply a constant pressure into the system. While a pump can optionally be used, the method disclosed herein can be accomplished without a pump.

Figure 3:
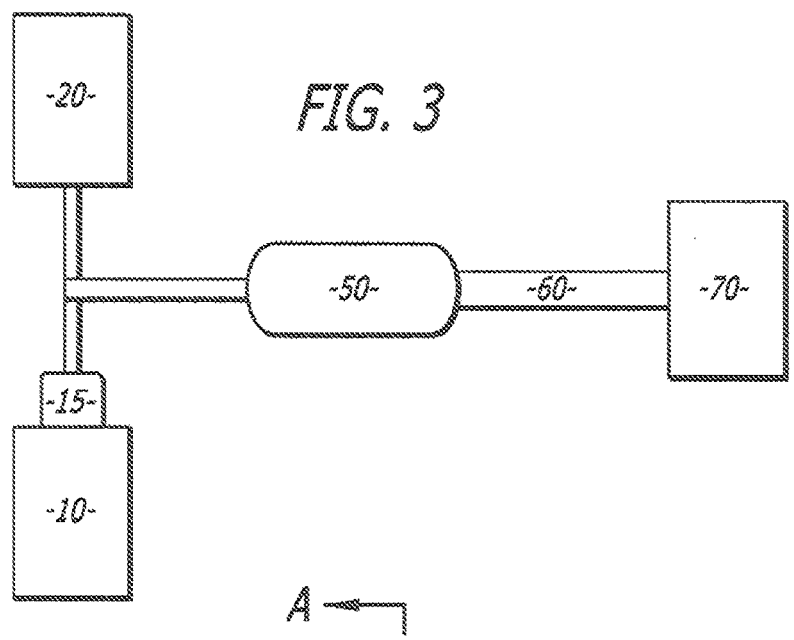
FIG. 3 illustrates an embodiment of a system for use in accordance with the disclosed methods and apparatuses.

An exemplary system for practicing the disclosed method is shown conceptually in FIG. 3. The carbon dioxide supply 10 and water supply 20 are simultaneously provided to in-line solubilizer 50. The in-line solubilizer 50 is followed by retention network 60, which is in turn followed by dispenser 70.

Carbon dioxide supply 10 can be embodied by any known way for supplying a gas. A commercially available CO2 canister is preferably used. The carbon dioxide supply would typically be connected through a regulator 15, which provides a controlled supply pressure to the in-line solubilizer 50.

The system is further fed by water supply 20. This supply can consist of a simple municipal or well water feed. Preferably, the water supply 20 comprises a chiller to cool the water because carbon dioxide solubilizes more readily into colder water.

The water supply system 20 also optionally comprises a pump to provide a consistent water pressure. As discussed above, the pressure at a typical home or commercial water tap may vary from location to location or from time to time. A pump will ensure that the apparatus receives a consistent pressure no matter what the local supply pressure is. This same goal of providing a consistent supply pressure can be achieved by other known techniques without departing from the scope of the disclosure. For example, an elevated water reservoir could use gravity and appropriately sized water conduits to provide a consistent water supply pressure.

Figure 4:
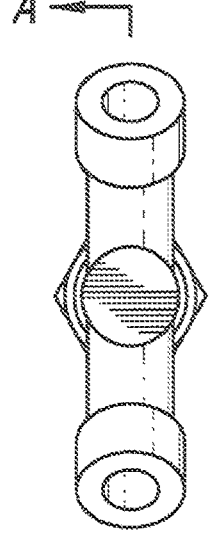
FIGS. 4 and 4A show views of an embodiment of an apparatus for use with the disclosed systems and methods.

An exemplary embodiment of the collision chamber is shown in FIG. 4. The carbon dioxide and water are brought into contact via a Y-shaped inlet manifold 400 having two inlets, one for a carbon dioxide supply the other for a water supply. In this embodiment, the two inlets are identical and interchangeable. The manifold used to introduce the carbon dioxide and water into the collision chamber can be of any other suitable arrangement, for example, T-shaped or F-shaped. As a further example, the supplies could be provided by a concentric tube within a tube structure. The Y-shaped manifold, or other shapes depending on their need, could also include an initial divider to prevent one stream going into the other supplies' inlet. Furthermore, standard backflow preventers can also be used within the inlets or upstream of the inlets. Furthermore, the flow of water and carbon dioxide can also be controlled by valves or regulators at the entrance of the manifold.

The incoming water pressure affects the flow and pressure through the remainder of the system. A minimum pressure of 10 psi is sufficient to achieve a satisfactory flow rate and carbonation. A flow rate in the range of 0.1 gpm to 1.5 gpm has been found to be particularly advantageous, but even higher flow rates are also acceptable.

The carbon dioxide is provided at a pressure between 45 psi and 125 psi. Preferably, the carbon dioxide pressure provided at the Y-shaped inlet manifold is kept close to the water pressure provided at the Y-inlet manifold.

Figure 4A:
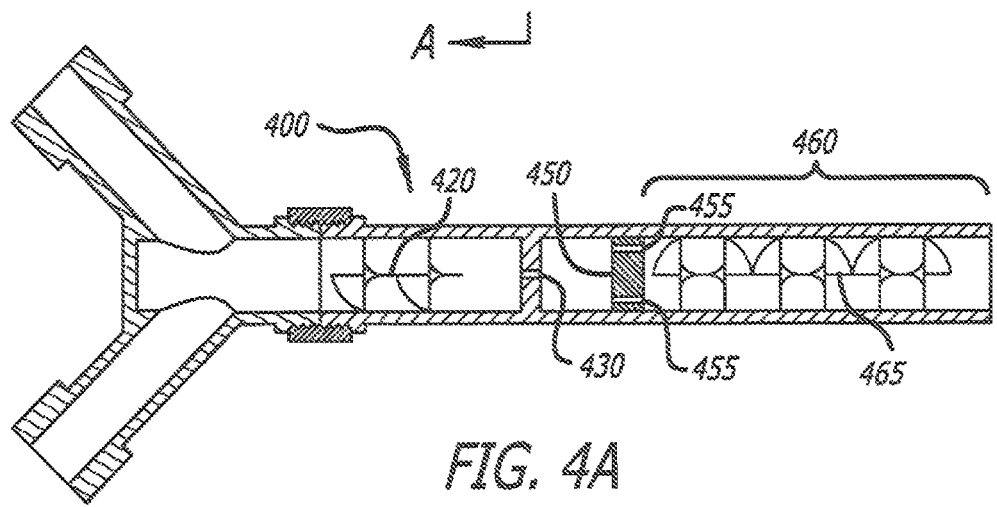

In the embodiment of FIGS. 4 and 4A, flow developers 420 are provided within the flow path after the inlet manifold. The flow developers are used in order to prevent a stratified, or laminar, carbon dioxide/water flow. Instead, the flow developers create a substantially dispersed flow, typically an annular-dispersed flow. The embodiment of FIG. 4 uses passive flow developers comprised of helically shaped elements 520, shown in detail in multiple views in FIG. 5A Other passive directional mixers capable of dispersing the carbon dioxide and water flow would also be suitable, such as protrusions from the conduit wall. Alternatively, active mixers, such as spinning blades can be used. As shown in FIG. 4, the flow developing elements 420 can be arranged in series to achieve the desired level of dispersion. The flow developing elements can similarly be used in combinations of different types, including mixed passive and active elements.

The dispersed stream of carbon dioxide/water is then accelerated by forcing it through a restrictor/accelerator 430. As is well known in the art, passing a fluid flow through a restriction will result in an accelerated flow, which arises due to the principle of mass conservation. The restrictor/accelerator is used to easily increase the kinetic energy of the carbon dioxide/water stream prior to the collision. Thus, for a given inlet speed and pressure, the energy of the of the carbon dioxide/water flow exiting the restrictor/accelerator will be increased without requiring an expensive pumping apparatus.

This increased kinetic energy results in a higher momentum change upon impact with the collision surface 450, thereby increasing the pressure achieved in the pressure zone, which results in improved solubilization at the collision site. The restrictor/accelerator 430 is a simple orifice. However, more complex engineered structures, such as a Venturi tube, can also be employed.

For a structure having a conduit cross sectional area A1 and a restriction cross sectional area A2, the total momentum, energy and mass are conserved and the conserved equations for the carbon dioxide/water stream can be written as:

Mass:

$$\frac{d}{dt} m_{tot} = \rho_1(v_1)A_1 - \rho_2(v_2)A_2$$

Momentum:

$$\frac{d}{dt} P_{tot} = \rho_1(v_1^2)A_1 - \rho_2(v_2^2)A_2 + \{p_1 A_1 - p_2 A_2\} - \{F\} + \{m_{tot} g\}$$

Energy:

$$\frac{d}{dt}(K_{tot} + Z_{tot} + H_{tot}) = -\Delta\left[\left(\frac{1}{2}\frac{(v^2)}{(v)} + Z + G\right)\rho(v)A\right] - W - E_v$$

It has been observed that good carbonation levels are achieved when the small restrictor/accelerator is designed such that the velocity of the incoming carbon dioxide/water steam is accelerated from one to up to 100 times its original velocity through the small passage.

The average velocity for a circular geometry, as for this apparatus, can be derived as:

$$(v^i) = \frac{\int_0^{2\pi}\int_0^R v^i r dr d\theta}{\int_0^{2\pi}\int_0^R r dr d\theta}$$

In the above equations:
$m_{tot}$=total mass of carbon dioxide/water mixture
$P_{tot}$=total momentum of carbon dioxide/water mixture
$K_{tot}$=total kinetic energy of carbon dioxide/water mixture
$Z_{tot}$=total potential energy of carbon dioxide/water mixture
$H_{tot}$=total Helmholtz (free energy) of carbon dioxide/water mixture
ρ=density
A=cross section
R=radius
−F=a vector representing the net force of the solid surfaces on the mixture and collision forces
p=pressure
G=Gibbs free energy
W=rate at which system performs mechanical work
$E_v$=energy loss When the carbon dioxide/water stream flows through the restriction, such as an orifice, there is a certain amount of energy loss (Ev). Assuming a quasi-steady flow, the energy loss can be derived as:

$$E_v = \frac{1}{2}(v)^2 e_v$$

In the above equation, $e_v$, is the loss coefficient which is a function of the Reynold's number and relates to the efficiency of the inlet to smoothly transition flow from the upstream to the restricted flow area. Many tabulated data are available to those of skill in the art for estimating the loss coefficient for different geometrical considerations. For a sudden contraction or converging restriction, the loss coefficient may be calculated as:

$$e_v = 0.45(1-\beta)$$

And for a sharp-edged orifice:

$$e_v = 2.7(1-\beta)(1-\beta^2)\frac{1}{\beta^2}$$

where β=is the ratio of the restricted area to the area before the restriction

It has been observed that acceptable solubilization in accordance with this disclosure is achieved with a sudden contraction or a converging restriction when it is designed to have a loss coefficient between 0.1 to 0.44, preferably about 0.41. For a sharp-edged orifice such as restrictor/accelerator 430 in FIG. 4, acceptable solubilization occurs with a loss coefficient larger than 10, preferably 60.

In addition, the size of the restrictions can be varied to achieve high quality carbonated water. The ratio of the inlet radius to the contracted area radius is optimally designed to be in the range between 1 (no restriction) and 20 (max restriction);

In the very neighborhood of the moving streamlines of carbon dioxide surrounded by water passing the restrictions, each stream acquires a certain amount of momentum and related kinetic energy. These streamlines, in turn, impart some of its momentum to the adjacent layer of solution causing it to remain in motion and accelerate further in the flow direction. The momentum flux, in this case, is in the direction of the negative velocity gradient. In other words, the momentum tends to go in the direction of decreasing velocity; thus the velocity gradient can be considered as the driving force for momentum transport.

When the carbon dioxide/water mixture is flowing through the narrow passage (example: the orifice) parallel to the surfaces, the velocity of the mixture in the flow direction decreases as approached to the surfaces. This velocity difference between the adjacent layers of the carbon dioxide and water results in a velocity gradient. By random diffusion of molecules occurring between faster moving layers of molecules and the slower adjacent layer, the momentum is transferred in the transverse direction within the narrow passage from the faster to the slower moving layer.

After leaving the restrictor/accelerator 430 the accelerated stream of carbon dioxide/water mixture, having reached a much higher kinetic energy, collides with stationary solid wall 450. The solid wall 450 can be of any shape or structure, preferably the wall is placed perpendicular to the carbon dioxide/water stream. The wall should be placed sufficiently close to the restrictor accelerator so that the increased kinetic energy achieved is not substantially lost due to frictional forces prior to reaching the wall 450. It has been found that acceptable results are achieved if the solid wall 450 is placed from approximately 0.1 inches and 2.0 inches from the restrictor/accelerator, preferably 0.5 inches.

Net forces generated through the collisions with the wall, i.e., the pressure energy densities ("PED") in the pressure zone, between a range of −40 foot-pound/cm³ to 5 foot-pound/cm³ have been found to produce acceptable solubilization. These forces can be created through adjusting the relative relationships of the geometries of the restrictor/accelerator, the conduit, the level of mixture achieved, and the starting pressure of the inlet carbon dioxide and water streams.

In an embodiment such as the one shown in FIG. 4, a flow rate of 0.5 gpm, inlet radius of 0.365 inch, orifice area of 0.04 inch (contraction ratio of 8.63), in which the inlet velocity of 5.15 in/s is accelerated 74 times to 382.97 in/s, the corresponding PED values as a function of inlet water/CO2 pressure is shown in the table below:

| Pressure (psi) | PED foot-lb/cm$^3$ |
|---|---|
| 20 | 0.10 |
| 40 | 0.20 |
| 60 | 0.31 |
| 80 | 0.41 |
| 100 | 0.51 |
| 120 | 0.61 |
| 140 | 0.71 |
| 160 | 0.81 |
| 180 | 0.92 |
| 200 | 1.02 |
| 220 | 1.12 |
| 240 | 1.22 |

Furthermore, the PED can be varied with respect to the flow rate of the carbon dioxide/water stream; by keeping an optimum inlet pressure, constant at 100 psi, and doubling the contraction ratio in the above example as shown in the Table below. As can be seen in the Table, the PED is a strong function of the flow rate.

| Flow Rate (gpm) | PED foot-lb/cm$^3$ |
|---|---|
| 0.1 | 0.5 |
| 0.5 | −0.2 |
| 0.9 | −1.9 |
| 1.3 | −4.5 |
| 1.7 | −8.1 |
| 2.1 | −12.6 |
| 2.5 | −18.1 |
| 2.9 | −24.5 |
| 3.3 | −31.9 |
| 3.7 | −40.3 |

The wall 450 further has outlet passages 455 to allow the further flow through the system. As shown in FIG. 4 this further connects to the inlet of retention network 460. The retention network can simply be a plain conduit. Retention network 460 of FIG. 4 is comprised of static helical mixers 465. Other types of packing materials, such as raschig rings, could also be used. Further, any of the static or active mixing elements described as suitable for creating a dispersed flow could be put to use in the retention network to further enhance contact and solubilization of CO2 in water.

The length and configuration of the retention network and the size of the packing materials within the retention network can be modified to obtain different levels of carbonation to dispense carbonated water with different levels of solubilization. Generally, longer retention networks, preferably up to 10 inches, raise the carbonization level by allowing more time for mixing contact between the carbon dioxide and water in the fluid stream. Longer retention networks also increase the pressure at the outlet passages of the collision chamber 455, which increases the pressure within the collision chamber and stabilizes the entire flow rate.

The length and composition of the retention network can also be used to obtain a desired pressure at the outlet of the retention network, which is preferably connected to the beverage dispensing tap. For a retention network comprising helical static mixers, the pressure drop can be calculated as:

$$\Delta p = (k'_{OL} A + k_{OL}) \frac{64}{Re} \frac{L}{D} \frac{1}{2} \rho \langle v \rangle^2$$

Where:

$k'_{OL}$ and $k_{OL}$ are Reynold's number (Re) dependent constants which generally range between 0.02-0.1 and 3-12, respectively, with the particular values being readily available in pre-tabulated charts versus Reynold's number L=length of the helical mixers D=diameter Re=Reynold's number As can be seen from the above equation, the pressure drop achieved through the retention network is directly proportional to the ratio between the length and the diameter ("L/D"). Therefore, one can achieve similar pressure drops, flow and mixing characteristics by changing either the length or the diameter or both of the retention network. Packing materials also affect the pressure drop obtained. Generally, smaller size packing materials and longer retention networks increase the pressure drop.

Figures 1, 2, 3, 4, 5, 5A, 6:
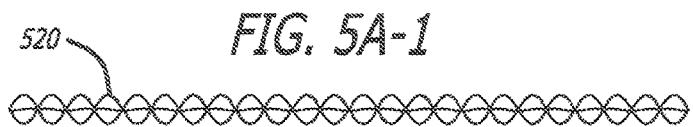
FIGS. 5A-1 to 5A-6 and 5B-1 to 5B-6 are conceptual diagrams illustrating one aspect of the disclosed methods, systems and apparatuses.
Figures 1, 5B:
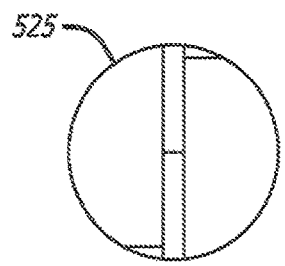
Figures 2, 5B:
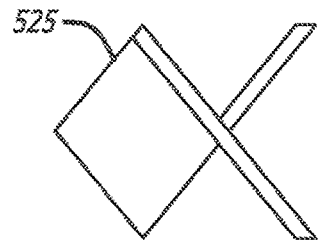
Figures 3, 5B:
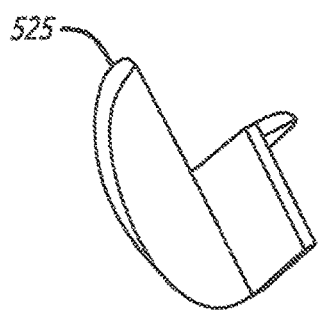
Figures 4, 5B:
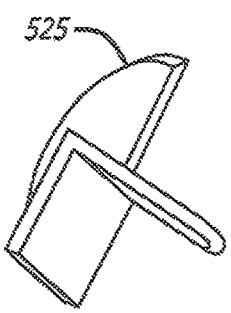
Figures 5, 5B:
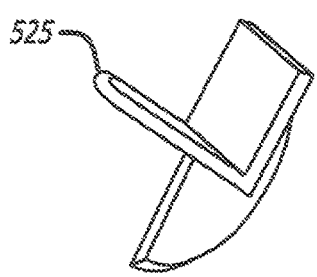
Figures 5, 5B, 6:
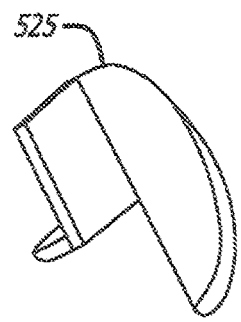
Figure 6:
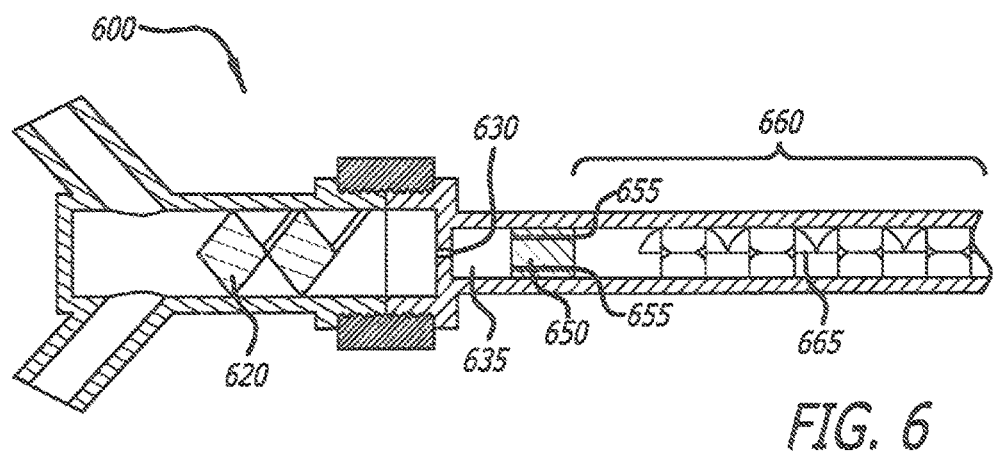

FIGS. 6 and 6A show an alternate embodiment with inlet manifold 600 having two inlets, one for a carbon dioxide supply the other for a water supply, an inlet chamber preferably having a size of 345 (the values provided give the relative sizes of the various components, thus no units are provided). Two stages of directional mixers 620 act as flow developers to create an annular-dispersed flow, alternate views of the flow developers 525 are shown in FIGS. 5A-1 to 5A6 and FIGS. 5B-1 to 5B-6. Restrictor/accelerator 630 is a simple orifice having a size of 4. The exit of the of the restrictor/accelerator leads to collision chamber 635, which has a length of 250. The back wall of the collision chamber is collision surface 650, having outlets 655. The outlets 655 lead to start of retention network 660, which contains helical static mixers 665.

Figure 7:
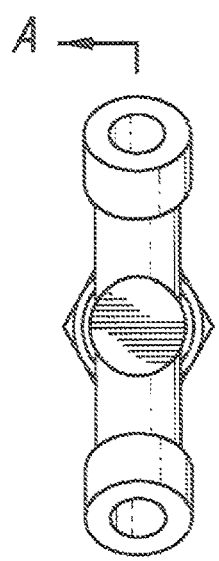
FIGS. 7 and 7A show views of an embodiment of an apparatus for use with the disclosed systems and methods.
Figure 7A:
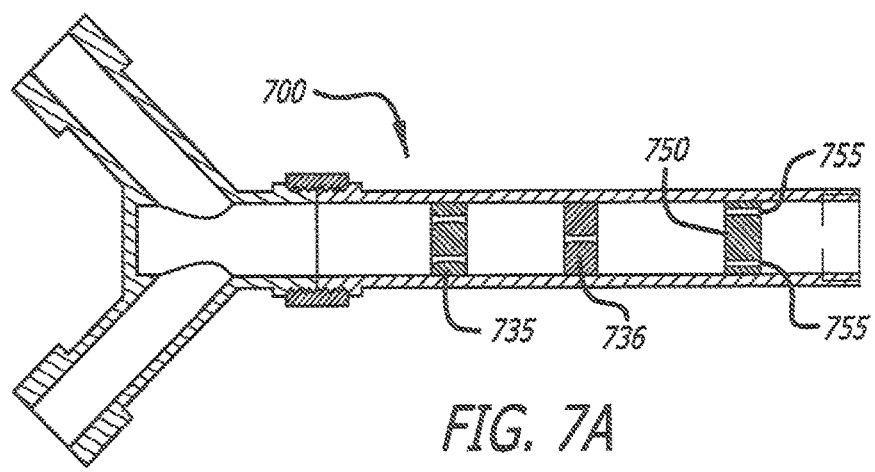

FIGS. 7 and 7A show another embodiment with inlet manifold 700 having two inlets, one for a carbon dioxide supply the other for a water supply. Flow development and acceleration is accomplished via two stages of hourglass shaped restrictor/accelerators 735 and 736. As shown, restrictor/accelerator 735 uses two of the hourglass shaped nozzles. Additional nozzles like this can be employed in other embodiments, and even more nozzles could be used if space permits. The streams exiting the nozzles of 735 are directed at the rigid surface adjacent to the entry of nozzle 736. Accordingly, this structure creates a first level of collision based solubilization. Further upon acceleration through nozzle 736, the stream is impacted on collision surface 750, having outlets 755. The staging multiple accelerations and collisions, as is done in this embodiment could also be applied to other embodiments. Collision surface 750 has outlets 755.

FIGS. 8 and 8A show an alternate embodiment with inlet manifold 800 having two inlets, one for a carbon dioxide supply the other for a water supply. Flow development and acceleration is accomplished via two stages of flow developing restrictor/accelerators 835 and 836. As shown, the front wall of flow developing restrictor/accelerator 835 has side passages that each lead to an hourglass shaped accelerator nozzle. The outlet streams from these nozzles impact the front wall of flow developing restrictor/accelerator 836, which is the same shape and similarly has two walls. The flow exiting these nozzles is directed at the rigid surface adjacent to the entry of nozzle 837, which accelerates the flow again for impact on collision surface 850, having outlets 855.

FIG. 9 shows an alternate embodiment with inlet manifold 900 having two inlets, one for a carbon dioxide supply the other for a water supply. Two stages of helical static mixers 920 act as flow developers. Restrictor/accelerator

930 is a simple orifice. The exit of the restrictor/accelerator leads to collision chamber 935, in which the stream is collided with a knife-like blade 950. The knife-like blade 950 creates collisions of streams that spin off the blade creating vortices and cavitations, which create high pressure zones amenable to solubilization. The blade can be stable or, preferably, it can be flexibly designed to resonate with the collisions thereby creating intense points of pressure at the focus of the resonation.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments.

It will be appreciated that many of those undescribed embodiments incorporate the same principles of the invention and others are equivalent. Thus, it is to be understood that other embodiments may be utilized and functional, logical, organizational, structural modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition.

In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional features and/or other aspects of the disclosure are not to be considered limitations on the disclosure as defined by the claims or limitations on equivalents to the claims.

The invention claimed is:

1. An apparatus for the solubilization of carbon dioxide in water comprising:
   a conduit defining a flow path;
   an inlet manifold on the proximal end of the conduit, the inlet manifold having a first branch to receive water and a second branch for receiving carbon dioxide;
   one or more dispersion elements arranged within the conduit;
   a passive accelerator within the conduit;
   a rigid impact surface, positioned between 0.1 to 2.0 inches downstream of the passive accelerator; and
   a retention network coupled to the distal end of the conduit.

2. The apparatus of claim 1, wherein the inlet manifold comprises a Y-shaped connector with a carbon dioxide supply on one branch of the Y-shaped inlet and a water supply on the other branch of the Y-shaped inlet.

3. The apparatus of claim 1, wherein the dispersion elements comprise at least one of static helical mixers and static directional mixers.

4. The apparatus of claim 1, wherein the passive accelerator comprises a cylindrical orifice.

5. The apparatus of claim 1, wherein the passive accelerator comprises an hourglass shaped nozzle.

6. The apparatus of claim 1, wherein the conduit, passive accelerator, and rigid impact surface are configured with respect to one another such that impact of a flow passing through the conduit at between 0.1 to 3.7 gallons per minute results in pressure energy densities at the rigid impact surface of between −40 foot-pound/$cm^3$ to 5 foot-pound/$cm^3$.

7. The apparatus of claim 1, wherein a ratio of the cross sectional area of a portion of the conduit immediately preceding the passive accelerator compared to the cross sectional area of a restriction within the passive accelerator is such that the restriction will accelerate the speed of a fluid flow within the conduit up to 100 times.

8. The apparatus of claim 1, wherein the rigid impact surface is oriented normal to the flow path through the conduit at an outlet of the passive accelerator and an output opening of the passive accelerator is configured such that a straight line projection from each point in the output opening along a longitudinal axis of the conduit intersects the rigid impact surface.

9. The apparatus of claim 1, wherein the passive accelerator comprises a contraction or converging restriction having an energy loss coefficient in the range of 0.1 to 0.44.

10. The apparatus of claim 1, wherein the dispersion element, the conduit, and the passive accelerator are aligned along a central longitudinal axis.

11. The apparatus of claim 10, wherein the rigid impact surface defines at least one peripheral flow path offset from the central longitudinal axis in direction transverse to the central longitudinal axis.

12. The apparatus of claim 10, wherein the retention network includes a second helical dispersion element aligned with the longitudinal axis.

13. An apparatus for the solubilization of carbon dioxide in water comprising:
   a tubular conduit disposed about a longitudinal axis, extending from an input end to an output end, and defining a fluid flow path from the input end to the output end;
   an inlet manifold comprising a first inlet for water, a second inlet for carbon dioxide, and an outlet in fluid communication with the input end of the conduit;
   a passive accelerator located within the conduit, the passive accelerator comprising a restriction of the conduit having a reduced cross sectional area relative to portions of the conduit immediately upstream and downstream of the restriction; and
   a rigid impact surface positioned between 0.1 to 2.0 inches downstream of the passive accelerator so as to limit an amount of kinetic energy that may be lost in a mixed flow of carbon dioxide and water received from the passive accelerator before contacting the rigid impact surface, wherein the rigid impact surface fills a central portion of the conduit and defines one or more peripheral flow paths located outside of the central portion of the tubular conduit; wherein:
      the tubular conduit and restriction portion are aligned along a central longitudinal axis, and the peripheral flow paths are offset from the central longitudinal axis in a direction transverse to the central longitudinal axis, and the passive accelerator has an output opening having a radial size that is less than the radial extent of the central portion of the conduit filled by the rigid impact surface.

14. The apparatus of claim 13, wherein the conduit, passive accelerator, and rigid impact surface are configured with respect to one another such that impact of a flow passing through the conduit at between 0.1 to 3.7 gallons per minute results in pressure energy densities at the rigid impact surface of between −40 foot-pound/cm$^3$ to 5 foot-pound/cm$^3$.

15. The apparatus of claim 14, where the inlet manifold comprises a Y-shaped connector with a carbon dioxide supply on one branch of the Y-shaped inlet and a water supply on the other branch of the Y-shaped inlet.

16. The apparatus of claim 13, comprising:

one or more dispersion elements arranged within the conduit, wherein the one or more dispersion elements comprise at least one of static helical mixers and static directional mixers.

17. The apparatus of claim 13, wherein the passive accelerator comprises a cylindrical orifice.

18. The apparatus of claim 13, wherein the passive accelerator comprises an hourglass shaped nozzle.

19. The apparatus of claim 13, comprising:

a retention network coupled to the output end of the conduit, wherein the retention network comprises static mixers.

20. The apparatus of claim 13, wherein a ratio of the cross sectional area of a portion of the conduit immediately preceding the passive accelerator compared to the cross sectional area of a restriction within the passive accelerator is such that it will accelerate the speed of a fluid flow within the conduit up to 100 times.

21. The apparatus of claim 13, wherein the rigid impact surface is oriented normal to the flow path through the conduit at an outlet of the passive accelerator and an output opening of the passive accelerator is configured such that a straight line projection from each point in the output opening along a longitudinal axis of the conduit intersects the rigid impact surface.

22. The apparatus of the claim 13, wherein the passive accelerator comprises a contraction or converging restriction having an energy loss coefficient in the range of 0.1 to 0.44.

* * * * *